(12) United States Patent
Contescu et al.

(10) Patent No.: US 8,834,829 B2
(45) Date of Patent: Sep. 16, 2014

(54) FORMING GAS TREATMENT OF LITHIUM ION BATTERY ANODE GRAPHITE POWDERS

(75) Inventors: Cristian Ion Contescu, Knoxville, TN (US); Nidia C. Gallego, Knoxville, TN (US); Jane Y. Howe, Oak Ridge, TN (US); Harry M. Meyer, III, Oak Ridge, TN (US); Edward Andrew Payzant, Oak Ridge, TN (US); David L. Wood, III, Knoxville, TN (US); Sang Young Yoon, Bedford, MA (US); Matthew R. Denlinger, Boston, MA (US)

(73) Assignee: UT-Battelle, LLC, Oak Ridge, TN (US)

( * ) Notice: Subject to any disclaimer, the term of this patent is extended or adjusted under 35 U.S.C. 154(b) by 234 days.

(21) Appl. No.: 13/596,291

(22) Filed: Aug. 28, 2012

(65) Prior Publication Data

US 2014/0065487 A1 Mar. 6, 2014

(51) Int. Cl.
*H01M 4/1393* (2010.01)
*H01M 4/133* (2010.01)
*B05D 5/12* (2006.01)

(52) U.S. Cl.
USPC ........ 423/448; 429/231.8; 427/113; 29/623.5

(58) Field of Classification Search
USPC ........ 423/448; 29/623.5; 427/113; 429/231.8
See application file for complete search history.

(56) References Cited

U.S. PATENT DOCUMENTS

2012/0201738 A1* 8/2012 Kwon et al. ............... 423/415.1

OTHER PUBLICATIONS

Figueiredo et al., "Modification of the surface chemistry of activated carbons", Carbon 37 (1999) 1379-1389.

* cited by examiner

*Primary Examiner* — Daniel C McCracken
(74) *Attorney, Agent, or Firm* — Novak Druce Connolly Bove + Quigg LLP

(57) ABSTRACT

The invention provides a method of making a battery anode in which a quantity of graphite powder is provided. The temperature of the graphite powder is raised from a starting temperature to a first temperature between 1000 and 2000° C. during a first heating period. The graphite powder is then cooled to a final temperature during a cool down period. The graphite powder is contacted with a forming gas during at least one of the first heating period and the cool down period. The forming gas includes $H_2$ and an inert gas.

17 Claims, 4 Drawing Sheets

FORMING GAS TREATMENT OF LITHIUM ION BATTERY ANODE GRAPHITE POWDERS

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates to battery anodes, and more particularly to battery anodes made with graphite.

BACKGROUND OF THE INVENTION

Currently the anode active material for lithium ion batteries consists of expensive synthetic graphite because it is heat treated to temperatures of 2500° C. or higher. It is desired to replace this material, which may have experienced multiple heat treatment steps to become graphitized, with a cheaper, single-step alternative heat treated to much lower temperatures and which implements a reduced thermal budget (time at higher temperatures). In addition, the surface chemistry of state-of-the-art synthetic graphites has not been optimized for the lithium ion battery operating environment in terms of formation of a stable anode surface electrolyte interface (SEI) layer. Lithium ion battery manufacturers purchase graphite powder with inherent surface properties, manufacture anodes, and assemble these anodes into cells without sufficiently considering the effect of these surface properties.

SUMMARY OF THE INVENTION

The invention provides a method of making a battery anode in which a quantity of graphite powder is provided. The temperature of the graphite powder is raised from a starting temperature to a first temperature between 1000 and 2000° C., during a first heating period. The graphite powder is then cooled to a final temperature during a cool down period. The graphite powder is contacted with a forming gas during at least one of the first heating period and the cool down period. The forming gas comprises $H_2$ and an inert gas.

The forming gas can comprise 4-10% $H_2$, by volume. The inert gas can be at least one selected from the group consisting of argon and nitrogen, and mixtures thereof. The rate of temperature increase of the graphite during the first heating period can be between 5 and 20° C./min.

The forming gas can be contacted with the graphite powder during the first heating period only. The forming gas can be contacted with the graphite powder during the cool down period only. The preferred method which significantly reduces the thermal budget has the forming gas contacted with the graphite powder during both the first heating period and the cool down period. The final temperature can be room temperature.

The method can comprise a first temperature hold period during the first heating period. The temperature of the graphite powder during the first temperature hold period is maintained at between 1000 and 1100° C. The duration of the first temperature hold period can be between 0.5 and 5 hr. The duration of the first temperature hold period can be between 1.5 and 2.5 hr.

The method can further comprise a second heating period. The second heating period follows the first heating period and is prior to the cool down period. The second heating period maintains the graphite powder at a second temperature lower than the first temperature. The forming gas is contacted with the graphite powder during at least the second heating period.

The temperature of graphite powder during the second heating period can be maintained between 800 and 1000° C. The duration of the second heating period is between 2 and 8 hr. The forming gas can be contacted with the graphite powder during the second heating period and not during the first heating period.

The method can further comprise the step of forming an anode with the graphite powder following the cool down step. The method can also include the step of assembling a lithium ion battery with the anode.

A battery anode can comprise natural graphite. The natural graphite has an untreated quantity of surface oxygen. The graphite of the anode has a quantity of surface oxygen that is less than the untreated quantity of surface oxygen on the graphite.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
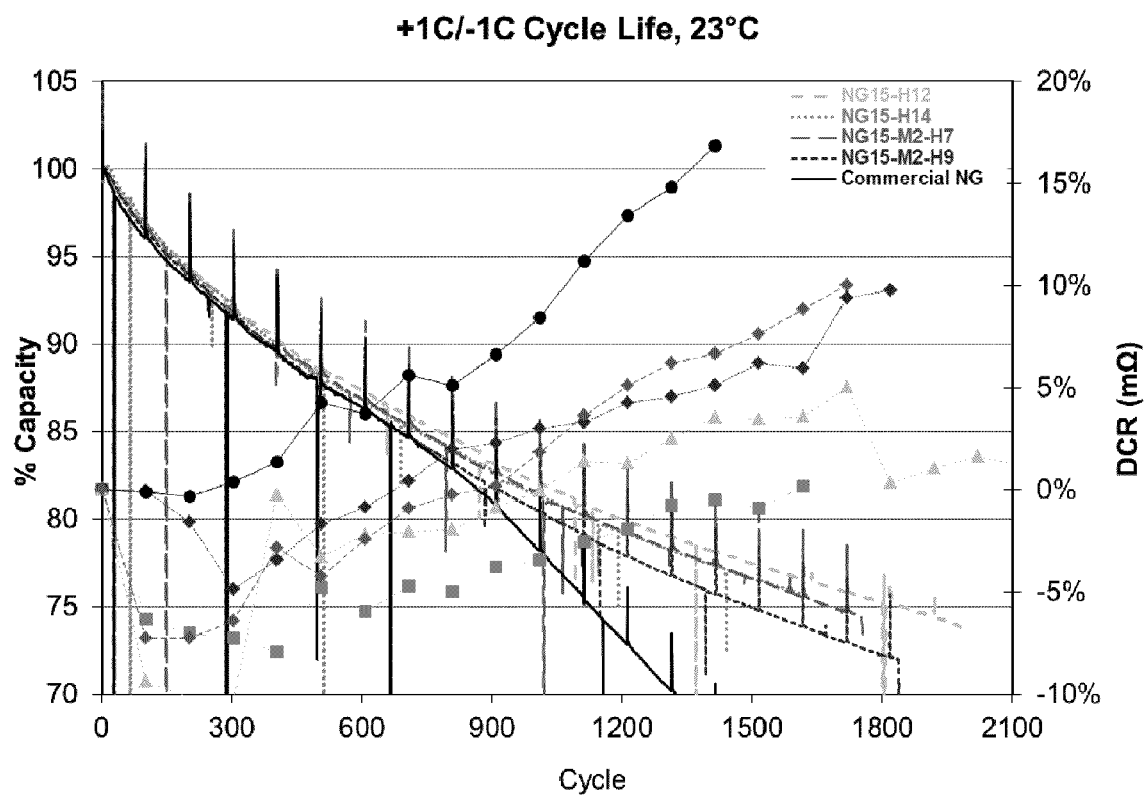
FIG. 1 is a plot of % capacity vs. cycles for cells made according to the invention and reference cells.

The invention provides a method of making a battery anode in which a quantity of graphite powder is provided. The temperature of the graphite powder is raised from a starting temperature to a first temperature between 1000 and 2000° C., during a first heating period. The graphite powder is then cooled to a final temperature during a cool down period. The graphite powder is contacted with a forming gas during at least one of the first heating period and the cool down period. The forming gas comprises $H_2$ and an inert gas.

The forming gas can comprise 4-10% $H_2$, by volume. The inert gas can be at least one selected from the group consisting of argon and nitrogen, and mixtures thereof at the approximate flow rate of 1 L/min.

The rate of temperature increase of the graphite during the first heating period can be between 5 and 20° C./min. Other temperature ramp rates, or variable temperature ramp rates, are also possible for minimizing the thermal budget of the treated anode.

Suitable graphite powders for use with the invention include any mined source of natural graphite particles with any shape characteristic (flake, spherical, etc.) and that have a particle size range between 0.1 micron and 100 micron. The graphite powder surface chemistry may contain an inherent amount of surface oxygen groups and can also be coated with amorphous carbon (such as pitch or hard carbon) ranging from 1-20 wt %. The coated natural graphite may also contain surface oxygen functional groups. Uncoated natural graphite powders will often have a lower raw material cost as compared to coated graphite powders.

The forming gas can be contacted with the graphite powder during the first heating period only. The forming gas can be contacted with the graphite powder during the cool down period only. In the preferred arrangement, the forming gas can be contacted with the graphite powder during both the first heating period and the cool down period for minimization of the thermal budget. The final temperature can be room temperature.

The graphite powders have oxygen-containing surface functions or oxygen-containing chemical groups. These can be chemically complex, and is reflected in the desorption products that were measured with TPD-MS and in the broad temperature range of their decomposition. Such desorption products can include, without limitation, carbon dioxide, carbon monoxide, and water. An analysis of the TPD-MS based on temperature and the desorbed gas ($CO$, $CO_2$, $H_2O$) reveals that the chemical nature of those surface groups can include carboxyl, lactones, ketones, acid anhydrides, phenols and others. These oxygen containing surface functions are reactive in the lithium ion battery operating environment and must be removed for proper functioning of the anode during long-term potential cycling. The invention provides an alternative to both high temperature (greater than 2000, or even 2500° C.) graphitization for forming the desired degree of crystallinity and removal of such reactive oxygen-containing groups.

The $H_2$ treatment at high temperature (over 950° C.) causes chemical reactions (reduction) of the oxygen containing surface groups and release of oxygen-containing compounds such as $CO$, $CO_2$, $H_2O$ and others. The removal of oxygen from the carbonaceous surface functions leaves the carbon atoms where the oxygen has been removed in a highly unsaturated state. These carbons tend to satisfy quickly the broken valence bonds. If these carbons were exposed to air, they would form back the surface oxides. The invention continues to expose these carbons to $H_2$ and maintain $H_2$ during cooling to room temperature in order to avoid re-oxidation and to promote binding hydrogen rather than oxygen. The newly formed C—H bonds passivate the carbon surface which is no longer reactive towards oxygen.

Temperature Programed Desorption—Mass Spectrometry (TPD-MS) was utilized to quantify the release of surface oxygen for the two different states of the amorphous carbon coated and uncoated graphite, both natural or material equilibrated in an ambient atmosphere, and thus with relatively more surface oxygen, and surface-treated material that has been processed according to the invention and thus has less surface oxygen. This is a method to determine the amount of oxygen on the surface after the heat treatment with $H_2$ atmosphere. Analysis of chemical functionalities on carbon surface using TPD-MS method is well documented in the literature [see for example J L Figueredo, M F R Pereira, M M A Freitas, J J M Orfao, "Modification of the surface chemistry of activated carbon", Carbon 37 (1999) 1379-1389, the disclosure of which is fully incorporated by reference]. It is based on the fact that surface oxygen groups on carbons decompose upon heating and release $H_2O$, $CO_2$ and $CO$ at different temperatures. Identification of decomposition products by mass spectrometry combined with information on the temperature range of decomposition allows qualitative differentiation between different surface chemical groups. Deconvolution and integration of MS peaks allows quantification of surface concentrations of various chemical groups, provided a reliable calibration is obtained in equivalent conditions. In summary, TPD-MS analysis is a convenient way to identify the nature and measure the amount of oxygen-containing surface functionalities on carbon materials.

The method can comprise a first temperature hold period during the first heating period. The temperature of the graphite powder during the first temperature hold period is maintained at between 1000 and 2000° C. The duration of the first temperature hold period can be between 0.5 and 5 hr. The duration of the first temperature hold period can be between 1.5 and 2.5 hr.

The method can further comprise a second heating period. The second heating period follows the first heating period and is prior to the cool down period. The second heating period maintains the graphite powder at a second temperature lower than the first temperature. The forming gas is contacted with the graphite powder during at least the second heating period.

The temperature of graphite powder during the second heating period is maintained between 800 and 1000° C. The duration of the second heating period is between 2 and 8 hr. The forming gas can be contacted with the graphite powder during the second heating period and not during the first heating period.

The method can further comprise the step of forming an anode with the graphite powder following the cool down step. The method can also include the step of assembling a lithium ion battery with the anode.

The invention takes natural graphite and subjects it to a heat-treatment protocol that must include exposure to forming gas (4% hydrogen in argon). The surface chemistry is optimized during the process for a lithium ion battery anode, and the maximum heat-treatment temperature required is reduced from 2500° C. to 1050° C. For this invention to provide the desired results, the natural graphite must have the correct specific properties and may have a surface coating of amorphous carbon.

The anode graphite powder is first loaded into a furnace in a graphite crucible at room temperature. The temperature is ramped up to the maximum value (i.e. 1050° C.) at 10° C./min and held at the maximum temperature for 2 h. After the 2-h hold, the furnace is allowed to cool to 900° C., at which point the forming gas (4% hydrogen in argon) is introduced. The temperature is held at 900° C. for 2-8 h to allow conversion of the surface chemistry. After the second hold at 900° C., the furnace is allowed to cool to room temperature with the graphite powder exposed to forming gas.

An alternative protocol is to perform the entire heat treatment with forming gas to save on processing energy costs and reduce the thermal budget of the heat treatment protocol. The anode graphite powder is first loaded into a furnace in a graphite crucible at room temperature.

The temperature is ramped up to the maximum value (such as 1050° C.) at 10° C./min and held at the maximum temperature for 2 h. After the 2-h hold, the furnace is allowed to cool to room temperature with the graphite powder exposed to forming gas.

A further alternative embodiment is to use a blend of 4-10% hydrogen in nitrogen as a substitute for the forming gas (such as 4% hydrogen in argon) during the heat treatment protocol. Nitrogen can provide cost raw material advantages to argon. This would provide additional cost savings to the heat treatment process.

The surface chemistry is optimized by chemically reducing with hydrogen of oxygen-containing surface functional groups during the process for a lithium ion battery anode, and the maximum heat-treatment temperature required is reduced by at least 500-1000° C. The invention combines a low-temperature heat-treatment protocol for natural graphite with a gas-phase surface treatment that changes the graphite surface chemistry from hydrophilic (oxide and water containing) to hydrophobic (limited oxide and water content). The maximum heat-treatment temperature required is only 1050° C. and exposes the graphite powder to forming gas (4% hydrogen in argon) either during the entire heat-treatment protocol or just a portion of the heat treating protocol, such as the cooling portion. This reduced processing temperature results in substantial processing energy savings. A further benefit is that the argon could be replaced with nitrogen because the maximum heat-treatment temperature is only 1050° C. (nitrogen cannot be used at temperatures greater than 1600-1700° C. because it will react with carbon to form poisonous HCN), resulting in even greater cost advantages for the anode graphite powder processing step.

Graphite powders subjected to the process of the invention have been used to form full coin cells. These cells demonstrate superior long term performance (capacity fade) to their counterparts without the forming gas surface treatment. In addition, the first-cycle coulombic efficiency in half cells was also increased due to improved surface interactions between the solid graphite and liquid battery electrolyte that forms the surface electrolyte interface (SEI) layer.

FIG. 1 presents data which demonstrates that the low-temperature treatments of the invention are not only superior in terms of cost, but also outperform the high-temperature baseline (black line) as well after 1750-2000 cycles. The data also validates the heat treatment process itself, which is the essence of the invention disclosure. The lines represent two different natural graphites (NG15 and NG15-M2) heat treated to only 1050° C. in either a 4% $H_2/Ar$ or 4% $H_2/N_2$ environment. They are derived from the natural graphite NG15. Sample NG15-H12 was obtained from NG15 by treating in 4% $H_2/Ar$, and NG15-H14 was obtained by treating in 4% $H_2/N_2$. Samples in NG15-M2 series were obtained by coating NG15 with hard carbon. The hard-carbon coated NG15-M2-H7 was treated in 4% $H_2/Ar$, and the hard-carbon coated NG15-M2-H9 was treated in 4% $H_2/N_2$. The data further suggests that the cheaper $N_2$ diluent gas can be used for the heat treatment since there is little long-term performance difference between the four samples (i.e. the performance differences are within the industry standard coin cell-to-cell experimental variation). Table 1 shows the identification of samples prepared and the conditions of their respective surface treatment.

TABLE 1

Sample names and conditions for surface treatment

| Surface Treatment | Natural Graphite Treatment Temperature | | | Coated Natural Graphite |
|---|---|---|---|---|
| | 950° C. | 1050° C. | 2000° C. | 1050° C. |
| Inert Environment | NG15-H2 | — | — | NG15-M2-H1 |
| ST-1 | — | NG15-H10 | NG15-H11 | — |
| ST-2 | — | NG15-H12 | NG15-H13 | NG15-M2-H7 |
| ST-3 | — | NG15-H14 | — | NG15-M2-H9 |

Note:
ST-1: $H_2/Ar$ mixture during cool down
ST-2: $H_2/Ar$ mixture during the whole treatment
ST-3: $H_2/N_2$ mixture during the whole treatment
NG15 is a sample of natural graphite which was characterization in absence of any treatment.

Example 1

Sample NG15-H2 was obtained from natural graphite NG15 by treatment in nitrogen to 950° C. About 100 g of natural graphite NG15 was loaded in a graphite crucible and placed in a controlled atmosphere furnace. After the air was replaced by a flow of pure nitrogen (1 L/min), the temperature was raised to 950° C. at 10° C./min. After 2 h hold time at 950° C. the furnace was allowed to cool to room temperature while maintaining a constant flow of pure nitrogen. The cold sample was removed, weighed, and stored in a tightly sealed glass jar.

Example 2

Sample NG15-H10 was obtained from natural graphite NG15 as shown in Example 1, with the difference that the treatment temperature was 1050° C., and that when the temperature reached 900° C. during cooling the flow of nitrogen was replaced with a flow of gas mixture (1 L/min) containing 4% vol $H_2$ in argon and the 900° C. temperature was held for 8 h.

Example 3

Sample NG15-H12 was obtained from natural graphite NG15 as shown in Example 1, with the difference that the treatment temperature was 1050° C. and the flow gas was a mixture containing 4% vol $H_2$ in argon.

Example 4

Sample NG15-H14 was obtained from natural graphite NG15 as shown in Example 1, with the difference that the treatment temperature was 1050° C. and the flow gas was a mixture containing 4% vol $H_2$ in nitrogen.

Example 5

Sample NG15-H11 was obtained from natural graphite Ng15 as shown in Example 1, with the difference that the treatment temperature was 2000° C., and the flow pure nitrogen was replaced with a flow of pure argon when the temperature reached 1700° C., and that when the temperature reached 900° C. during cooling the flow of pure argon was replaced with a mixture containing 4% vol $H_2$ in argon.

Example 6

Sample NG15-H13 was obtained from natural graphite NG15 as shown in Example 1, with the difference that the treatment temperature was 2000° C. and the flow gas was a mixture containing 4% vol $H_2$ in argon.

Example 7

Sample NG15-M2-H1 was obtained from hard carbon-coated natural graphite as shown in Example 1, with the difference that the treatment temperature was 1050° C.

Example 8

Sample NG15-M2-H7 was obtained from hard carbon-coated natural graphite as shown in Example 3.

Example 9

Sample NG15-M2-H9 was obtained from hard carbon-coated natural graphite as shown in Example 4.

Figure 2:
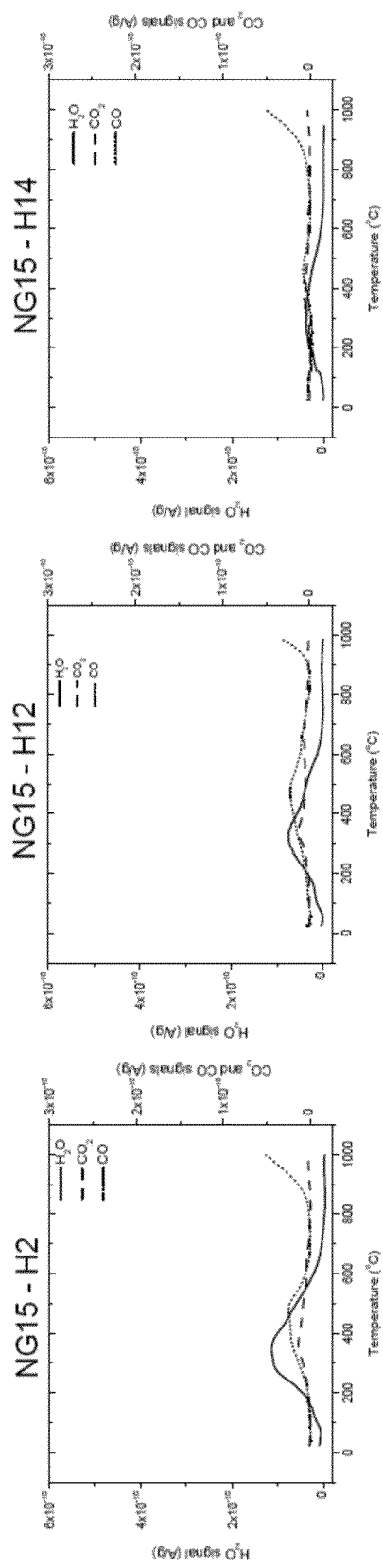
FIG. 2 is a Temperature Programmed Desorption-Mass Spectrometry plot of weight-normalized desorption peak intensities vs. temperature (° C.) for water, carbon dioxide, and carbon monoxide measured for several heat-treated samples derived from natural graphite. Note common scale in all plots.
Figure 3:
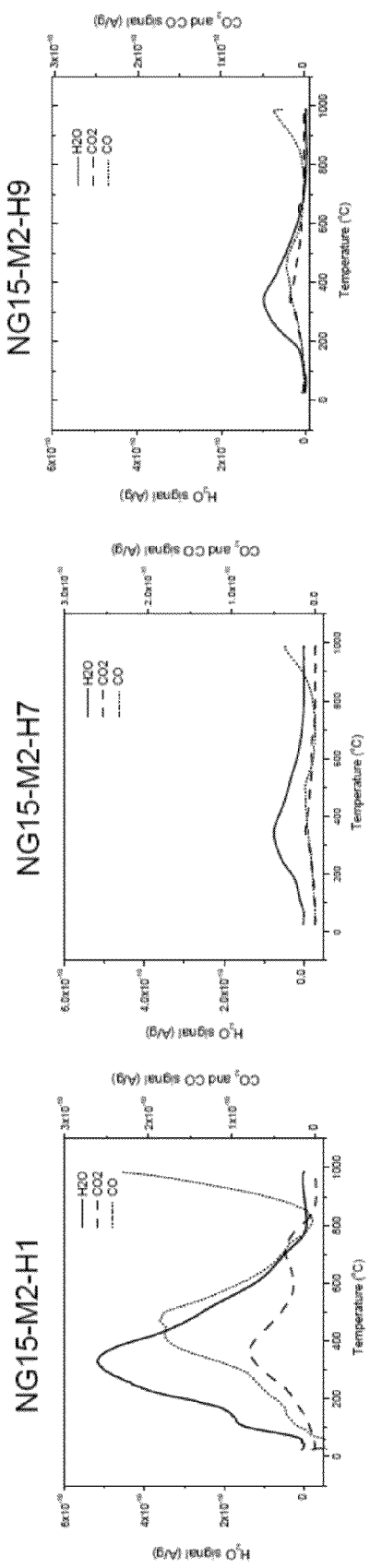
FIG. 3 is a Temperature Programmed Desorption-Mass Spectrometry plot of weight-normalized desorption peak intensities vs. temperature (° C.) for water, carbon dioxide, and carbon monoxide measured for several heat-treated samples derived from hard-carbon coated natural graphite. Note common scale in all plots.

The TPD-MS results for selected heat-treated samples are shown in FIGS. 2 and 3. For comparison, the TPD-MS results for natural graphite and hard carbon-coated natural graphite materials in absence of any heat treatment are shown in FIG. 4.

Figure 4:
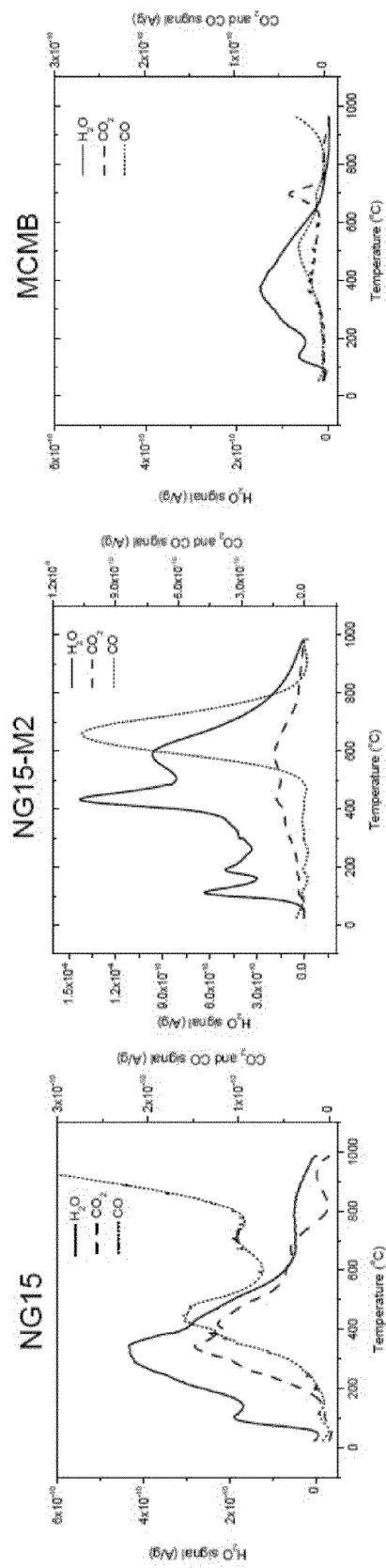
FIG. 4 is a Temperature Programmed Desorption-Mass Spectrometry plot of weight-normalized desorption peak intensities vs. temperature (° C.) for water, carbon dioxide, and carbon monoxide measured before heat treatment for natural graphite (NG15), hard carbon-coated natural graphite (NG15-M2) and for a reference anode material (MCMB). Note a different scale for NG15-M2.

The TPD-MS result for the reference MCMB material is also shown in FIG. 4 for comparison with the TPD-MS results of untreated materials in the same figure and of surface-treated materials in FIGS. 2 and 3.

The TPD-MS peaks for $H_2O$, $CO_2$, and CO have been integrated in the temperature range indicated and the weight-normalized values are presented in Table 2.

TABLE 2

Results of TPD-MS characterization of oxygen-containing surface functionalities showing the weight-normalized integrated MS signal and the corresponding weight percentage of desorption products

|  | H2O | | CO2 | | CO | |
| --- | --- | --- | --- | --- | --- | --- |
|  | As/g | wt % | As/g | wt % | As/g | wt % |
| NG15 | 1.00E−06 | 1.06 | 2.98E−07 | 0.66 | 1.09E−06 | 1.58 |
| NG15-H2 | 2.08E−07 | 0.22 | 2.50E−08 | 0.06 | 4.37E−08 | 0.06 |
| NG15-H12 | 1.67E−07 | 0.18 | 2.59E−08 | 0.06 | 6.01E−08 | 0.09 |
| NG15-H14 | 5.96E−08 | 0.06 | 9.80E−09 | 0.02 | 8.90E−09 | 0.01 |
| NG15-M2 | 2.81E−06 | 2.98 | 3.68E−07 | 0.81 | 1.06E−06 | 1.54 |
| NG15-M2-H1 | 1.75E−07 | 0.19 | 1.77E−07 | 0.39 | 2.60E−07 | 0.38 |
| NG15-M2-H7 | 1.41E−07 | 0.15 | 2.08E−08 | 0.05 | 2.23E−08 | 0.03 |
| NG15-M2-H9 | 1.77E−07 | 0.19 | 2.65E−08 | 0.06 | 3.41E−08 | 0.05 |
| MCMB | 3.04E−07 | 0.32 | 3.51E−08 | 0.08 | 3.99E−08 | 0.06 |

These values indicates that exposure to the $H_2$-inert gas mixture during heat treatment reduces the O-containing groups on the carbon surface. The effect is stronger for samples treated full time in $H_2$-inert gas mixture or at least 8 hours during cooling at 900° C. Integrating the area under the curve indicates the effect of prolonged exposure to $H_2$-inert gas mixture.

A battery anode can comprise natural graphite. The natural graphite has an inherent, untreated quantity of surface oxygen, which is not optimized for long-term lithium ion battery cycling. The amount of surface oxygen inherent to the untreated natural graphite is quantified by release of $H_2O$, $CO_2$, and CO as measured by TPD-MS. These amounts are as follows: $H_2O$, 0.1-5.0 wt % and preferably 1.0-3.0 wt %; $CO_2$, 0.1-3.0 wt % and preferably 0.5-1.5 wt %; and CO, 0.1-4.0 wt % and preferably 0.5-2.5 wt %. The graphite of the anode has a quantity of surface oxygen that is less than the untreated quantity of surface oxygen on the graphite. It should release no more CO, $CO_2$, and $H_2O$ than that measured in Table 2 for samples NG15-H12, NG15-H14, NG15-M2-H7, and NG15-M2-H9. Ratios of released oxygen containing species from the treated natural graphite surface to the amounts present prior to heat treatment should be 0.02 to 0.20 and preferably 0.04 to 0.07 for $H_2O$, 0.02 to 0.20 and preferably 0.03 to 0.07 for $CO_2$, and 0.01 to 0.20 and preferably 0.01 to 0.04 for CO.

It should be understood that the embodiments and examples described herein are for illustrative purposes and that various modifications or changes in light thereof will be suggested thereby and are to be included within the spirit and purview of this application. The invention can take other specific forms without departing from the spirit or essential attributes thereof.

We claim:

1. A method of making a battery anode, comprising the steps of:
   providing a quantity of graphite powder;
   raising the temperature of the graphite powder from a starting temperature to a first temperature between 1000 and 2000° C., during a first heating period;
   cooling the graphite powder to a final temperature during a cool down period;
   contacting the graphite powder with a forming gas during at least one of the first heating period and the cool down period, the forming gas comprising $H_2$ and an inert gas, wherein the forming gas comprises 4-10% $H_2$, by volume.

2. The method of claim 1, wherein the inert gas is at least one selected from the group consisting of argon and nitrogen, and mixtures thereof.

3. The method of claim 1, wherein the rate of temperature increase of the graphite during the first heating period is between 5 and 20° C./min.

4. The method of claim 1, wherein the forming gas is contacted with the graphite powder during the first heating period only.

5. The method of claim 1, wherein the forming gas is contacted with the graphite powder during the cool down period only.

6. The method of claim 1, wherein the forming gas is contacted with the graphite powder during the first heating period and the cool down period.

7. The method of claim 1, wherein the final temperature is room temperature.

8. The method of claim 1, further comprising a first temperature hold period during the first heating period.

9. The method of claim 8, wherein the temperature of the graphite powder during the first temperature hold period is maintained at between 1000 and 1100° C.

10. The method of claim 9, wherein the duration of the first temperature hold period is between 0.5 and 5 hr.

11. The method of claim 9, wherein the duration of the first temperature hold period is between 1.5 and 2.5 hr.

12. The method of claim 1, further comprising a second heating period, the second heating period following the first heating period and prior to the cool down period, the second heating period maintaining the graphite powder at a second temperature lower than the first temperature, the forming gas being contacted with the graphite powder during at least the second heating period.

13. The method of claim 12, wherein the temperature of graphite powder during the second heating period is maintained between 800 and 1000° C.

14. The method of claim 12, wherein the duration of the second heating period is between 2 and 8 hr.

15. The method of claim 12, wherein the forming gas is contacted with the graphite powder during the second heating period and not during the first heating period.

16. The method of claim 1, further comprising the step of forming an anode with the graphite powder following the cool down step.

17. The method of claim 16, further comprising the step of assembling a lithium ion battery with the anode.

* * * * *